Oct. 31, 1967  M. BLUME  3,350,064

FENCE STRETCHER

Filed April 4, 1966

INVENTOR.

Maurice Blume

United States Patent Office 3,350,064
Patented Oct. 31, 1967

3,350,064
FENCE STRETCHER
Maurice Blume, St. Francis, Kans. 67756
Filed Apr. 4, 1966, Ser. No. 539,679
4 Claims. (Cl. 254—83)

This invention relates to various wire stretching devices, and more particularly to a fence stretcher.

It is therefore the main purpose of this invention to provide a fence stretcher which is adapted to adjust each wire of a fence at a substantially identical tension.

Another object of this invention is to provide a fence stretcher capable of adjusting and weaving wire fences and sagging gates.

Another object of this invention is to provide a fence stretcher which is adapted to be removably attached to a fence post.

A still further object of this invention is to provide a fence stretcher which is easy to manufacture and provides maximum utility to its user.

Other objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
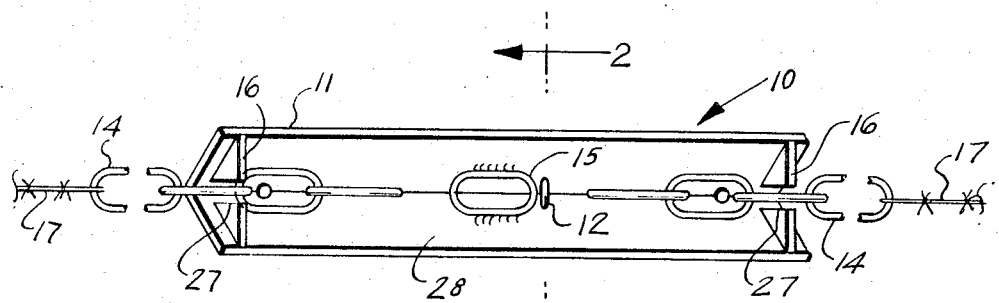
FIGURE 1 is a perspective view of this invention.
Figure 2:
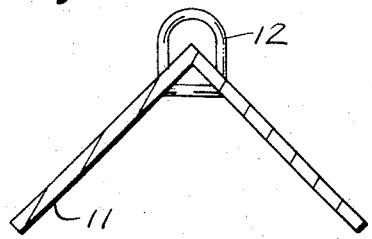
FIGURE 2 is a cross-sectional view taken along lines 2—2 of FIGURE 1 and viewed in the direction of the arrows.

According to this invention, a fence stretcher 10 is provided with an angular metallic member 11. A metallic loop 12 welded into the angular portion of member 11 in order to secure fence stretcher 10 to a post (not shown) by means of a chain link or heavy wire protruding through the outer loop portion of the metallic loop 12. The actual tightening of the wire is accomplished by using tightening member 13 provided with a notch 21 which is inserted into the chain link 15 welded to the inside portions of angular member 11. Then lever 13 is pressed toward hook 18 which is removably connected with one chain link of the chain 14. Afterwards lever 13 is moved backwards which causes the chain 14 to move toward the inside portion of member 11. Fence wire 17, which is connected to at least one chain link of chain 14, moves in the same direction as chain 14 thereby tightening or providing tension to the fence.

Figure 3:
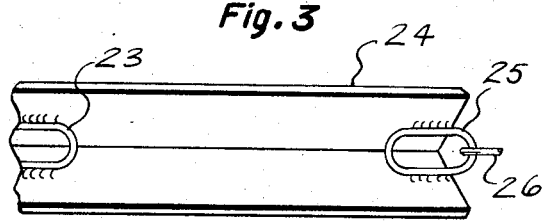
FIGURE 3 is a fragmentary perspective view showing a modified form of the invention.
Figure 4:
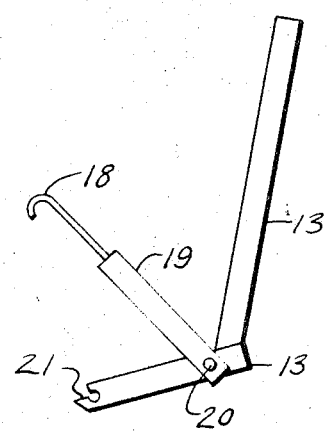
FIGURE 4 is a side elevational view showing a removing device.

Looking now at FIGURE 3 of the drawing, one will see that angular member 24 is provided with a chain link 23 which is welded into the interior of angular member 24 and is adapted to pull wire (not shown) in one direction by means of tightening member 13 connected to the member 24 in a manner which is substantially identical with the description in reference to FIGURE 1. The chain 26 is used to secure member 24 to a post (not shown) and is made a part of member 24 by welding link 25 to member 24. It should be noted that member 11 is provided with at least one pair of chain locking devices 16 which are secured within member 11 by welding. The purpose of locking device 16 is to secure and position each chain link of chain 14 within the member 11. This is done by turning the respective chain link in such a manner that said link rests on the edges of locking device 16. Furthermore, locking device 16 is provided with a slot 27 adapted to admit chain links into the inside portion of member 11. Again, the link is turned and its outer end portion rests on the edges of locking device 16.

Figure 5:
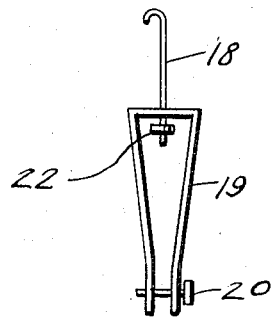
FIGURE 5 is an end view of the hook member shown removed from the tightening device illustrated in FIGURE 4.

It will also be noted that FIGURE 5 shows that chain 14 can be turned without any difficulty by means of hook 18 positioned within yoke 19. Hook 18 is secured within said yoke because of supporting head 22 which is secured to the bottom portion of hook 18 permitting said hook to turn in all directions.

What I now claim is:

1. A fence stretcher comprising an elongated, angular member, a pair of locking supports having slots therein secured within said member, a metallic loop secured to the exterior of said member for attaching said member to a post of a fence, a chain link welded into the internal portion of said angular member, a chain arrangement on each end of said angular member, a tightening device removably attached to said chain link and the end links of said chain arrangement for pulling said arrangement into the inside portion of said angular member, wire attached to said chain arrangement, chain links of said chain arrangement adapted to pass through said slots of said locking supports and tightening said wire around the fence in accordance with movements of said chain links into said angular member, and said chain links being adapted to be locked withing said angular member.

2. A fence stretcher according to claim 1, wherein said tightening device comprises a lever, a hook within a yoke, said hook being adapted for insertion into at least one chain link of said chain arrangement, said lever being secured to said hook for manually disposing at least one of said chain links into said angular member, and a securing member having a notch therein for supporting said tightening device on said chain link welded into the internal portion of said angular member and a pin securing said yoke and said device one to another.

3. A fence stretcher according to claim 2, wherein said hook is provided with a supporting head positioned within said yoke for enabling said hook to be turned with said chain link of said chain arrangement.

4. A fence stretcher according to claim 1, wherein the ends of said chain links are adapted to rest on the edges of said locking supports when said wire is being tightened.

References Cited
UNITED STATES PATENTS

| | | | |
|---|---|---|---|
| 818,379 | 4/1906 | Holmes | 254—74 |
| 1,518,769 | 12/1924 | Brunk | 254—78 |
| 3,041,041 | 6/1962 | Weldon | 24—116 X |

WILLIAM FELDMAN, *Primary Examiner.*

MILTON S. MEHR, *Examiner.*